(12) United States Patent
Glugla

(10) Patent No.: US 10,443,517 B2
(45) Date of Patent: Oct. 15, 2019

(54) SYSTEMS AND METHODS FOR ENGINE CONTROL

(71) Applicant: Ford Global Technologies, LLC, Dearborn, MI (US)

(72) Inventor: Chris Paul Glugla, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/133,358

(22) Filed: Sep. 17, 2018

(65) Prior Publication Data

US 2019/0017455 A1    Jan. 17, 2019

Related U.S. Application Data

(62) Division of application No. 15/585,963, filed on May 3, 2017, now Pat. No. 10,138,830.

(51) Int. Cl.
| | |
|---|---|
| *F02P 5/00* | (2006.01) |
| *F02D 41/00* | (2006.01) |
| *F02D 35/02* | (2006.01) |
| *F02D 41/14* | (2006.01) |
| *F02D 43/04* | (2006.01) |
| *F02M 35/10* | (2006.01) |
| *F02D 37/02* | (2006.01) |
| *F02M 26/49* | (2016.01) |
| *F02P 5/15* | (2006.01) |
| *F02P 5/152* | (2006.01) |
| *F02P 5/04* | (2006.01) |

(52) U.S. Cl.
CPC ....... *F02D 41/0052* (2013.01); *F02D 35/027* (2013.01); *F02D 37/02* (2013.01); *F02D 41/0072* (2013.01); *F02D 41/1454* (2013.01); *F02D 43/04* (2013.01); *F02M 26/49* (2016.02); *F02M 35/1038* (2013.01); *F02P 5/1504* (2013.01); *F02P 5/1516* (2013.01); *F02P 5/045* (2013.01); *F02P 5/152* (2013.01)

(58) Field of Classification Search
CPC ..... F02D 37/02; F02P 5/00; F02P 5/04; F02P 5/15; F02P 5/1455; F02P 5/151; F02P 5/152; F02P 5/1516
USPC .............. 701/103, 108; 123/406.11, 406.16, 123/406.23, 406.24, 406.26, 406.29, 123/406.34, 406.37, 406.41, 406.44, 123/406.45
See application file for complete search history.

(56) References Cited

U.S. PATENT DOCUMENTS

| | | |
|---|---|---|
| 5,190,017 A | 3/1993 | Cullen et al. |
| 9,074,541 B2 | 7/2015 | Surnilla et al. |
| 2007/0028893 A1 | 2/2007 | Hernandez |

(Continued)

*Primary Examiner* — John Kwon
(74) *Attorney, Agent, or Firm* — Geoffrey Brumbaugh; McCoy Russell LLP

(57) ABSTRACT

Methods and systems are provided for adjusting spark timing and fueling in an engine in response to an indication of exhaust gas recirculation (EGR) system degradation due to a disconnected upstream hose of an EGR differential pressure sensor. In one example, a method may include, responsive to an integrated knock intensity being greater than a threshold intensity and a fuel control correction being greater than a threshold enrichment, setting an EGR rate to zero and triggering an EGR differential pressure sensor upstream hose diagnostic routine to be performed. Further, spark timing and fueling may be set for zero EGR.

11 Claims, 6 Drawing Sheets

(56) References Cited

U.S. PATENT DOCUMENTS

| | | |
|---|---|---|
| 2015/0068506 A1 | 3/2015 | Gokhale et al. |
| 2016/0053729 A1 | 2/2016 | Geckler et al. |
| 2016/0123249 A1 | 5/2016 | Sakayanagi et al. |
| 2016/0123264 A1 | 5/2016 | Oyagi et al. |
| 2017/0306893 A1 | 10/2017 | Leone et al. |
| 2018/0058391 A1 | 3/2018 | Gibson et al. |
| 2018/0170353 A1* | 6/2018 | Ulrey .................... B60W 20/15 |
| 2018/0171886 A1* | 6/2018 | Ulrey .................... F02M 26/53 |
| 2018/0171898 A1* | 6/2018 | Ulrey .................... F02M 26/04 |
| 2018/0171911 A1* | 6/2018 | Ulrey .................... F01N 3/021 |
| 2018/0171913 A1* | 6/2018 | Ulrey ........................ F01N 3/20 |
| 2018/0320611 A1* | 11/2018 | Glugla ................ F02D 41/0072 |

\* cited by examiner

SYSTEMS AND METHODS FOR ENGINE CONTROL

CROSS REFERENCE TO RELATED APPLICATION

The present application is a divisional of U.S. patent application Ser. No. 15/585,963, entitled "SYSTEMS AND METHODS FOR ENGINE CONTROL," filed on May 3, 2017. The entire contents of the above-referenced application are hereby incorporated by reference in its entirety for all purposes.

FIELD

The present description relates generally to methods and systems for controlling an engine responsive to degradation of exhaust gas recirculation control.

BACKGROUND/SUMMARY

An engine may include an external exhaust gas recirculation (EGR) system to reduce NOx emissions and increase engine efficiency. The external EGR system may couple an engine exhaust manifold to an engine intake manifold via an EGR passage. Further, the EGR system may include temperature and/or pressure sensors to estimate the amount of EGR flowing to engine cylinders. During the course of operation, an EGR actuator, sensor, conduit, or hose may become disconnected. The EGR system component may become dislodged due to engine boost pressure, vibrations caused by irregular road surfaces, or other conditions. Degradation of the EGR system may degrade engine performance, for example, by increasing emissions or reducing fuel economy.

As one example, an EGR flow rate may be determined based on output of a differential pressure sensor, such as a delta pressure feedback of EGR (DPFE) sensor. Typically, the differential pressure sensor includes an upstream hose and a downstream hose, which are both coupled to the EGR passage on either side of a metered orifice. When EGR flows through the EGR passage, a pressure drop occurs across the metered orifice, which is measured by the differential pressure sensor and used to determine the EGR flow rate. If the upstream hose becomes disconnected, the differential pressure sensor may measure a large pressure differential (e.g., delta pressure), indicating a high EGR flow rate, even if no EGR is flowing. This may degrade air-fuel control, increase emissions, and lead to engine knock, for example.

Various approaches are provided for periodically or opportunistically monitoring EGR system components. One example approach for diagnosing an EGR differential pressure sensor is shown by Cullen et al. in U.S. Pat. No. 5,190,017. Therein, a measured EGR flow is compared to an expected EGR flow based on measurements from redundant sensors to determine whether one of the EGR system components has become inoperable. If the two estimates deviate by a calibrated amount for a sustained period of time, then a fault condition in the EGR system is indicated. Specifically, disconnection of the upstream hose may be indicated based on a delta pressure measured by the EGR differential pressure sensor being greater than an expected deviation from an exhaust backpressure.

However, the inventors herein have recognized potential issues with such systems. As one example, redundant sensors and methods for determining EGR flow may add to vehicle complexity and costs. Additionally, if the upstream hose of the EGR differential pressure sensor becomes disconnected after the upstream hose test is performed, the disconnection may not be identified in a timely fashion, which may degrade engine operation, increase emissions, and reduce the life of engine components.

The inventors herein have recognized that EGR system degradation due to a disconnected EGR differential pressure sensor upstream hose may result in a specific combination of changes to measurable engine parameters, which may be used to identify the EGR system degradation. In particular, if the upstream hose is disconnected, there is actually no EGR, which causes engine knocking to increase. As a result of the increased knock, adaptive spark may be retarded, such as toward a maximum retard clip, even though the EGR sensor continues to indicate that there is a high EGR flow rate (a condition when knock is not expected). Additionally, since there is no EGR actually displacing air in the induction system, a lower air flow is measured, and the engine controller may fuel the engine in accordance with the lower air flow. As a result, a measured exhaust air-fuel ratio may run leaner than expected. By monitoring for the above-mentioned change in engine parameters (or a combination thereof), degradation of an EGR differential pressure sensor due to a disconnected upstream hose can be opportunistically diagnosed using existing engine components.

In one example, EGR system degradation may be diagnosed by a method comprising: during engine operation with a commanded amount of EGR, responsive to at least one of an integrated knock intensity of an engine being greater than a threshold intensity and a fuel control correction of fuel supplied to the engine being greater than a threshold enrichment, setting an exhaust gas recirculation (EGR) rate to zero. Further, EGR system degradation may be indicated, and an active EGR differential pressure sensor upstream hose diagnostic test may be performed to confirm the diagnosis.

As one example, during engine operation with EGR commanded, an engine controller may non-intrusively monitor one or more engine parameters to diagnose for EGR differential pressure sensor upstream hose disconnection. For example, the controller may monitor engine knock intensity and frequency over a number of engine cycles. If the integrated intensity exceeds a threshold, a criterion for potential disconnection of the hose may be considered satisfied. As another example, adaptive spark may be monitored and if spark hits a retard clip within a defined number of engine cycles, another criterion for potential disconnection of the hose may be considered satisfied. As a further example, feedback fuel control may be monitored, and if fuel has to be enrichened by more than a threshold to maintain a target air-fuel ratio (e.g., to maintain a stoichiometric air-fuel ratio based on feedback from an air-fuel ratio sensor), then a further criterion may be considered met. If one or more or all of the criteria are met, the controller may infer that the upstream hose coupled to the EGR system differential pressure sensor is disconnected. Responsive to the indication of degradation, further EGR flow may be disabled by setting the EGR rate to zero, while spark and fuel are adjusted based on a zero EGR flow rate, independent of the output of the EGR sensor. For example, the spark timing may be retarded relative to when a non-zero amount of EGR is supplied, and the fueling amount may be increased in order to account for a greater cylinder air amount compared to when EGR is supplied. In addition, an intrusive EGR differential pressure sensor monitor may be run at the earliest to confirm the indication of degradation.

In this way, EGR system degradation may be diagnosed using existing engine sensors, without compromising the accuracy of diagnosis. The technical effect of monitoring for a specific combination of changes in engine knock intensity, spark control, and fuel control during engine operation with commanded EGR is that EGR hose disconnection can be reliably identified anytime it occurs during engine operation, including after a dedicated upstream hose monitor has run. By commanding the hose monitor to be run in response to degradation being detected during engine operation, disconnection may be confirmed and addressed in a timely fashion. By disabling EGR and setting spark timing and fueling for zero EGR responsive to the degradation, a further occurrence of knock may be reduced, thereby improving fuel economy and extending the life of engine components. In addition, exhaust emissions quality may be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
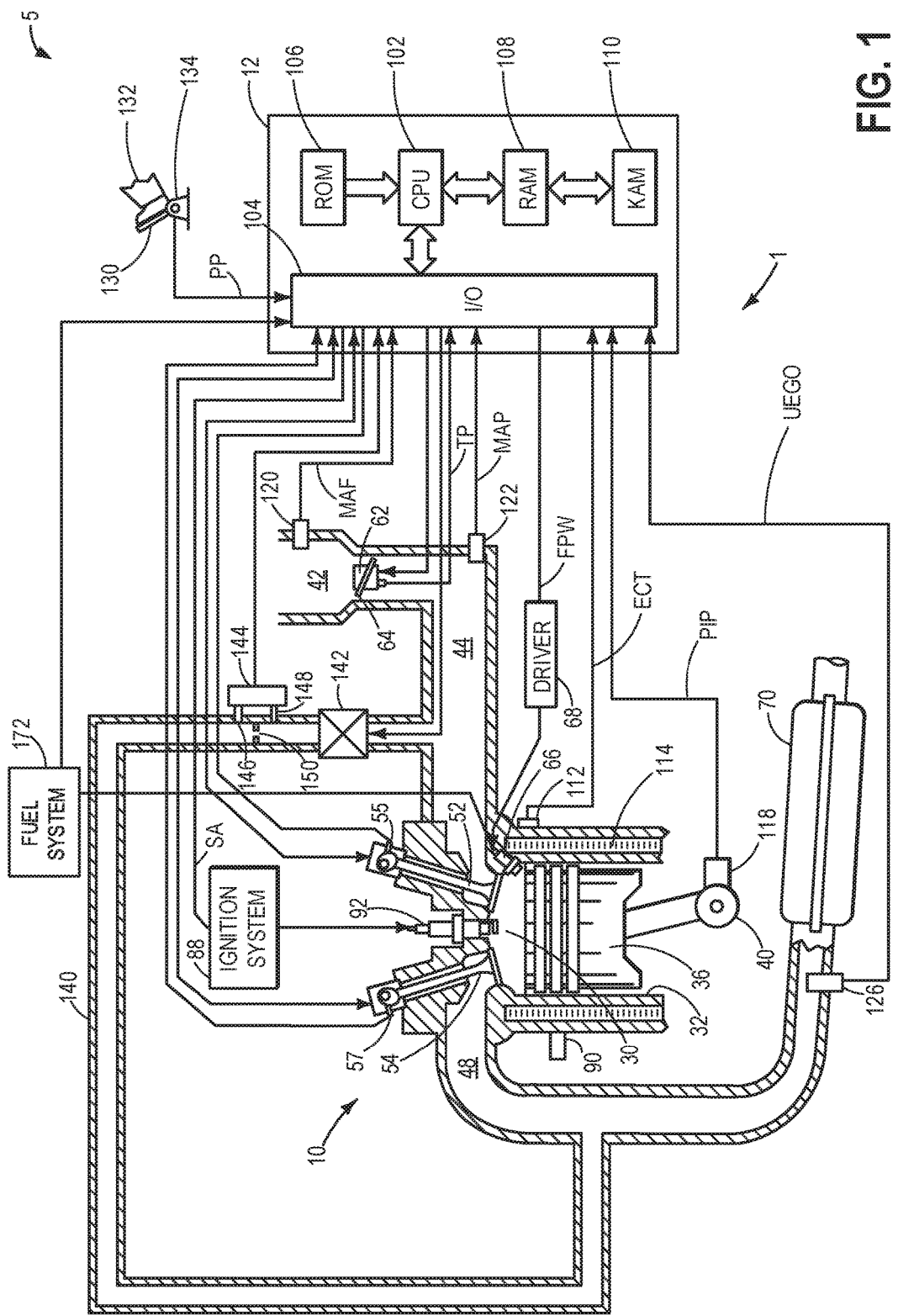
FIG. 1 shows a schematic depiction of an engine system of a vehicle, including an exhaust gas recirculation (EGR) system.

The following description relates to systems and methods for diagnosing degradation of an EGR system due to a disconnected upstream hose of an EGR differential pressure sensor. An example engine system, including an EGR system, is shown in FIG. 1. EGR may be provided to achieve a desired engine dilution, for example, according to the example method of FIG. 3. As shown in the method of FIG. 4, the amount of EGR entering the engine may be used in generating a fuel command. If the upstream hose of the EGR differential pressure sensor becomes disconnected, it may appear like more EGR is entering the engine than actually is, which may be non-intrusively detected by an engine controller according to the method of FIG. 2. Then, the EGR differential pressure sensor upstream hose may be diagnosed, for example, by running a dedicated monitor according to the method of FIG. 5. FIG. 6 shows an example timeline for identifying EGR system degradation due to a disconnected EGR differential pressure sensor upstream hose and adjusting engine operation accordingly.

FIG. 1 illustrates a schematic diagram showing one cylinder 30 of a multi-cylinder engine 10, which may be included in an engine system 1. Engine system 1 may be a propulsion system included in a motor vehicle 5. Engine 10 may be controlled at least partially by a control system, including a controller 12, and by input from a vehicle operator 132 via an input device 130. In this example, input device 130 includes an accelerator pedal and a pedal position sensor 134 for generating a proportional pedal position signal PP. Combustion chamber (e.g., cylinder) 30 of engine 10 may include combustion chamber walls 32 with a piston 36 positioned therein. Piston 36 may be coupled to a crankshaft 40 so that reciprocating motion of the piston is translated into rotational motion of the crankshaft. Crankshaft 40 may be coupled to at least one drive wheel of the vehicle via an intermediate transmission system. Further, a starter motor may be coupled to crankshaft 40 via a flywheel to enable a starting operation of engine 10.

Combustion chamber 30 may receive intake air from an intake manifold 44 via an intake passage 42 and may exhaust combustion gases via an exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two more exhaust valves. In this example, intake valve 52 and exhaust valve 54 may be controlled by cam actuation via one or more cams and may utilize one or more of cam profile switching (CPS), variable cam timing (VCT), variable valve timing (VVT), and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

In some embodiments, each cylinder of engine 10 may be configured with one or more fuel injectors for providing fuel thereto. As a non-limiting example, cylinder 30 is shown including one fuel injector 66, which is supplied fuel from a fuel system 172. Fuel injector 66 is shown coupled directly to cylinder 30 for injecting fuel directly therein in proportion to the pulse width of signal FPW received from controller 12 via an electronic driver 68. In this manner, fuel injector 66 provides what is known as direct injection (hereafter also referred to as "DI") of fuel into combustion cylinder 30.

It will be appreciated that in an alternate embodiment, fuel injector 66 may be a port injector providing fuel into an intake port upstream of cylinder 30. It will also be appreciated that cylinder 30 may receive fuel from a plurality of injectors, such as a plurality of port injectors, a plurality of direct injectors, or a combination thereof.

Continuing with FIG. 1, intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30, among other engine cylinders, through intake passage 42 and intake manifold 44. The position of throttle plate 64 may be provided to controller 12 by throttle position signal TP. Intake passage 42 may include a mass air flow (MAF) sensor 120 and a manifold air pressure (MAP) sensor 122 for providing respective signals MAF and MAP to controller 12.

An ignition system 88 can provide an ignition spark to combustion chamber 30 via a spark plug 92 in response to spark advance signal SA from controller 12, under select operating modes. Although spark ignition components are shown, in some embodiments, combustion chamber 30 or one or more other combustion chambers of engine 10 may be operated in a compression ignition mode, with or without an ignition spark.

Engine 10 may further include a knock sensor 90 coupled to each cylinder 30 for identifying abnormal cylinder combustion events. In alternate embodiments, one or more knock sensors 90 may be coupled to selected locations of the engine block. The knock sensor may be an accelerometer on the cylinder block or an ionization sensor configured in the spark plug of each cylinder. The output of the knock sensor may be combined with the output of a crankshaft acceleration sensor to indicate an abnormal combustion event in the cylinder. In one example, based on the output of knock sensor 90 in one or more defined windows (e.g., crank angle timing windows), abnormal combustion due to one or more of knock and pre-ignition may be identified and differentiated. For example, knock may be identified responsive to knock sensor output obtained in a knock window being higher than a knock threshold, while pre-ignition may be identified responsive to knock sensor output obtained in a pre-ignition window being higher than a pre-ignition threshold. The pre-ignition threshold may be higher than the knock threshold, and the pre-ignition window may be earlier than the knock window, for example. Further, once identified and differentiated, the abnormal combustion event may be accordingly addressed, as described further with respect to FIG. 2.

An exhaust gas sensor 126 is shown coupled to exhaust passage 48 upstream of an emission control device 70. Exhaust gas sensor 126 may be any suitable sensor for providing an indication of exhaust gas air-fuel ratio (AFR), such as a linear wideband oxygen sensor (UEGO); a two-state narrowband oxygen sensor (EGO); a heated EGO (HEGO); or a $NO_x$, HC, or CO sensor. In the non-limiting embodiments described herein, exhaust gas sensor 126 is a UEGO sensor configured to provide output, such as a voltage signal, that is proportional to the amount of oxygen present in the exhaust gas. Controller 12 uses the output to determine the exhaust gas AFR, which may be used as feedback for generating a fuel command, as described further with respect to FIG. 4.

Emission control device 70 is shown arranged along exhaust passage 48 downstream of exhaust gas sensor 126. In the non-limiting embodiments described herein, emission control device 70 is a three-way catalyst (TWC) configured to reduce $NO_x$ and oxidize CO and unburnt hydrocarbons. In other embodiments, however, emission control device 70 may be a $NO_x$ trap, various other emission control devices, or combinations thereof.

Engine system 1 may include an external exhaust gas recirculation (EGR) system to route a desired portion of exhaust gas from exhaust passage 48 to intake manifold 44 via an EGR passage 140. The amount of EGR provided to intake manifold 44 may be varied by controller 12 via an EGR valve 142. For example, EGR valve 142 may be opened in variable amounts from fully open to fully closed, thus supplying a desired amount of EGR. EGR valve 142 may be a vacuum actuated valve, an electronically activated solenoid valve, or other type of flow control valve.

An EGR sensor may be arranged within EGR passage 140 to provide an indication of one or more of pressure, temperature, and oxygen concentration of the recirculated exhaust gas. In the example of FIG. 1, the EGR sensor is a differential pressure sensor 144, such as a delta pressure feedback of EGR (DPFE) sensor. Differential pressure sensor 144 may provide feedback for controlling an EGR flow rate by monitoring a pressure differential (e.g., delta pressure) across a metered (e.g., restrictive) orifice 150. Differential pressure sensor 144 includes an upstream hose 146 fluidically coupling an upstream pressure port of the sensor to EGR passage 140 upstream of orifice 150 and a downstream hose 148 fluidically coupling a downstream pressure port of the sensor to EGR passage 140 downstream of orifice 150. The upstream pressure port and upstream hose 146 may have a larger internal diameter than the downstream pressure port and downstream hose 148, for example.

A pressure-sensitive disc, such as a piezo ceramic disc, may be included within differential pressure sensor 144 between the upstream and downstream pressure ports and may be used to generate a voltage proportional to the delta pressure across orifice 150. When EGR valve 142 is closed, no exhaust gas flows through orifice 150, and the pressure at the upstream pressure port is the same as the pressure at the downstream pressure port of differential pressure sensor 144. Without a pressure difference, differential pressure sensor 144 may output a small voltage (e.g., 0.45-1.0 V) equivalent to a 0 in $H_2O$ pressure differential. As EGR valve 142 is opened, exhaust gas flows through orifice 150 to replace the exhaust gas that flows to intake manifold 44 via EGR valve 142. A pressure drop occurs across orifice 150 due to the restriction of orifice 150. For example, a first pressure at upstream hose 146 and the upstream pressure port of differential pressure sensor 144, which is equal to an exhaust gas pressure, is greater than a second pressure at downstream hose 148 and the downstream pressure port, creating a negative delta pressure (defined as the first pressure subtracted from the second pressure). As the opening of EGR valve 142 increases, the pressure drop across orifice 150 increases (e.g., becomes more negative), resulting in a greater voltage output of differential pressure sensor 144.

Differential pressure sensor 144 may be used to determine an EGR flow rate. For example, a controller (e.g., controller 12) may reference a look-up table, with the voltage output of differential pressure sensor 144 as the input and the EGR flow rate as the output. The controller may then use the determined EGR flow rate as feedback to adjust a position of EGR valve 142 until a desired (e.g., commanded) EGR flow rate is reached, as described further with respect to FIG. 3. For example, if the determined EGR flow rate is higher than the desired EGR flow rate, the controller may actuate EGR valve 142 to a more closed position, and if the determined EGR flow rate is lower than the desired EGR flow rate, the controller may actuate EGR valve 142 to a more open position.

While differential pressure sensor 144 is shown upstream of EGR valve 142, in other examples, differential pressure sensor 144 may be located downstream of EGR valve 142 and upstream of intake manifold 44. In still other examples, differential pressure sensor 144 may be a combination sensor comprising both a differential pressure sensing element and a manifold absolute pressure sensing element.

Differential pressure sensor 144 may be intermittently diagnosed by running one or more dedicated, intrusive monitors. For example, upstream hose 146 may be diagnosed for disconnection once per drive cycle, after a threshold duration has elapsed, or after a threshold distance of vehicle travel, as described with respect to FIG. 5. However, upstream hose 146 may become disconnected after the monitor has been run. If upstream hose 146 becomes disconnected, exhaust gas may escape to the atmosphere. For example, if upstream hose 146 becomes disconnected while EGR is requested, an amount of EGR being supplied to intake manifold 44 may be much lower than commanded, which may cause engine knock to occur. Adaptive spark retard may be used to help mitigate the occurrence of knock. Further, with a much smaller amount of EGR displacing air in the intake manifold, a lower air flow is measured, degrading air-fuel control, as described further with respect to FIG. 4. As a result, a measured exhaust AFR may be leaner than expected. The lean exhaust AFR may be used as feedback for correcting the amount of fuel delivered to the engine to achieve a desired AFR (e.g., stoichiometry), resulting in a large fuel control correction enrichment. Controller 12 may monitor for knock, adaptive spark retard, and fuel control correction while the engine is running with EGR commanded and infer degradation of the EGR system, such as due to a disconnection of upstream hose 146, responsive to an integrated knock intensity surpassing a threshold intensity, spark retard hitting a clip, and the fuel control correction surpassing a threshold enrichment, as elaborated with respect to FIG. 2.

Under some conditions, the EGR system may be used to regulate the temperature of the air and fuel mixture within the combustion chamber. Further, during some conditions, a portion of combustion gases may be retained or trapped in the combustion chamber by controlling exhaust valve timing, such as by controlling a variable valve timing mechanism, in what is known as internal EGR.

Controller 12 is shown in FIG. 1 as a microcomputer, including microprocessor unit 102, input/output ports 104, an electronic storage medium for executable programs and calibration values shown as read-only memory chip 106 in this particular example, random access memory 108, keep alive memory 110, and a data bus. Controller 12 may receive various signals from sensors coupled to engine 10 in addition to those signals previously discussed, including measurement of inducted mass air flow (MAF) from MAF sensor 120, engine coolant temperature (ECT) from a temperature sensor 112 coupled to a cooling sleeve 114, a profile ignition pickup signal (PIP) from a Hall effect sensor 118 (or other type) coupled to crankshaft 40, throttle position (TP) from a throttle position sensor, absolute manifold pressure (MAP) signal from MAP sensor 122, and UEGO sensor output (UEGO) from UEGO sensor 126. An engine speed signal, RPM, may be generated by controller 12 from signal PIP. Controller 12 may receive input data from the various sensors, process the input data, and trigger various actuators, such as EGR valve 142 and fuel injector 66, in response to the processed input data based on instructions or code programmed therein corresponding to one or more routines. For example, based on engine operating conditions, controller 12 may actuate EGR valve 142 open to direct exhaust to intake manifold 44, with the degree of opening corresponding to a desired amount of EGR, and adjust the position of EGR valve 142 based on feedback from differential pressure sensor 144 in order to achieve the desired amount of EGR, as described further with respect to FIG. 3. In another example, controller 12 may use the output of knock sensor 90 to infer knock and the potential disconnection of upstream hose 146 when EGR is requested, as elaborated with respect to FIG. 2.

Storage medium read-only memory 106 can be programmed with computer readable data representing non-transitory instructions executable by processor 102 for performing the methods described below as well as other variants that are anticipated but not specifically listed.

As described above, FIG. 1 shows only one cylinder of a multi-cylinder engine, and each cylinder may similarly include its own set of intake/exhaust valves, fuel injector(s), spark plug(s), etc.

In this way, the components of FIG. 1 enable an engine system comprising: an engine having a cylinder; an intake manifold and an exhaust system; an EGR system, comprising an EGR passage fluidically coupling the intake manifold to the exhaust system, the EGR passage including a restrictive orifice; an EGR valve coupled to the EGR passage, and a differential pressure sensor for sensing EGR flow, the sensor including an upstream hose coupled to the EGR passage, upstream of the restrictive orifice, and a downstream hose coupled to the EGR passage, downstream of the restrictive orifice; a spark plug for providing spark to the cylinder; a knock sensor; a manifold absolute pressure (MAP) sensor coupled to the intake manifold for estimating an engine airflow; an exhaust gas oxygen sensor coupled to the exhaust system; and a controller configured with computer readable instructions stored on non-transitory memory for: operating the engine with an EGR flow; estimating a cylinder air amount based on each of the engine airflow and the EGR flow; calculating each of a fuel command based on the cylinder air amount and a correction to the fuel command based on exhaust gas oxygen sensor output; calculating a spark timing based in part on the EGR flow; detecting knock based on output of the knock sensor; retarding spark from the determined spark timing in response to knock detection; and indicating potential disconnection of the upstream hose from at least one of the EGR passage and the differential pressure sensor responsive to each of the correction to the fuel command being greater than a threshold enrichment, an integrated output of the knock sensor being greater than a threshold intensity, and spark retard reaching a spark retard threshold. Additionally or alternatively, the controller may include further instructions for, responsive to the indication of potential disconnection of the upstream hose, disabling the EGR system and confirming the disconnection of the upstream hose of the differential pressure sensor based on a presence of EGR flow through the EGR passage. In some examples, disabling the EGR system may further include commanding the EGR valve fully closed and setting the EGR flow to zero. As a further example, confirming the disconnection of the upstream hose based on the presence of EGR flow may include measuring a delta pressure across the restrictive orifice with the differential pressure sensor while the EGR valve is maintained closed and indicating disconnection of the upstream hose in response to the delta pressure being lower than a threshold.

Figure 2:
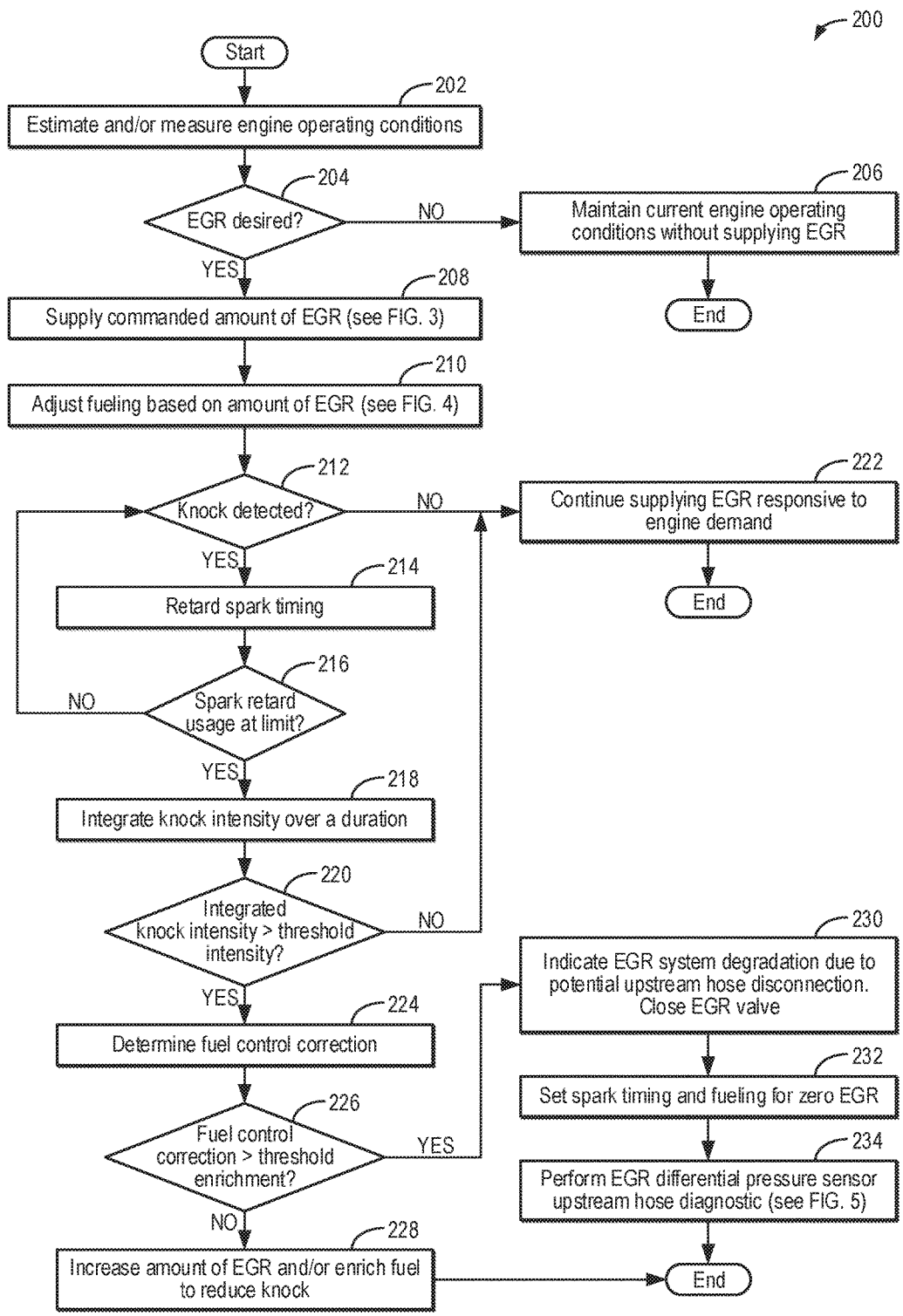
FIG. 2 is a high-level flow chart of an example method for detecting EGR system degradation and adjusting engine operation in response to the degradation.

Turning now to FIG. 2, an example method 200 for detecting EGR system degradation in an engine system and prompting an EGR differential pressure sensor upstream hose diagnostic to be performed is shown. For example, if an upstream hose (e.g., upstream hose 146 of FIG. 1) of the EGR differential pressure sensor becomes disconnected, the EGR differential pressure sensor may measure a large differential pressure, equating to an erroneously high EGR flow rate. Specifically, FIG. 2 shows a method for determining EGR system degradation based on multiple criteria: a propensity for engine knock, knock adaptive spark correction, and a fuel control correction, which may all result from operating the engine with a lower actual amount of EGR than commanded. Further, method 200 includes adjustments to engine operation, including spark timing and fueling, responsive to the degradation. Instructions for carrying out method 200 and the rest of the methods included herein may be executed by a controller, such as controller 12 of FIG. 1, based on instructions stored on a memory of the controller and in conjunction with signals received from sensors of the engine system, such as the sensors described above with reference to FIG. 1. The controller may employ engine actuators of the engine system to adjust engine operation according to the methods described below.

Method 200 begins at 202 and includes estimating and/or measuring engine operating conditions. Conditions assessed may include, for example, engine temperature; engine load; driver torque demand; manifold air flow; manifold air pressure; engine speed; throttle position; exhaust pressure; exhaust AFR; ambient conditions, including ambient temperature, pressure, and humidity; etc.

At 204, it is determined if EGR is desired. EGR may be desired to attain a desired engine dilution, thereby improving fuel efficiency and emissions quality. For example, EGR may be requested at low to mid engine loads. Additionally, EGR may be desired after an exhaust catalyst (e.g., emission control device 70 of FIG. 1) has attained its light-off temperature. An amount of EGR requested may be based on engine operating conditions, including engine load (as estimated via a pedal position sensor), engine speed (as estimated via a crankshaft acceleration sensor), engine temperature (as estimated via an engine coolant temperature sensor), etc. For example, the controller may refer a look-up table having the engine speed and load as the input and output a desired amount of EGR corresponding to the input engine speed-load, as elaborated with respect to FIG. 3.

If EGR is not desired, method 200 proceeds to 206 and includes maintaining current engine operating conditions without supplying EGR. For example, an EGR valve (e.g., EGR valve 142) will be maintained in a closed position, thereby blocking a flow of EGR from an EGR passage to an intake manifold of the engine. Following 206, method 200 ends.

Figure 3:
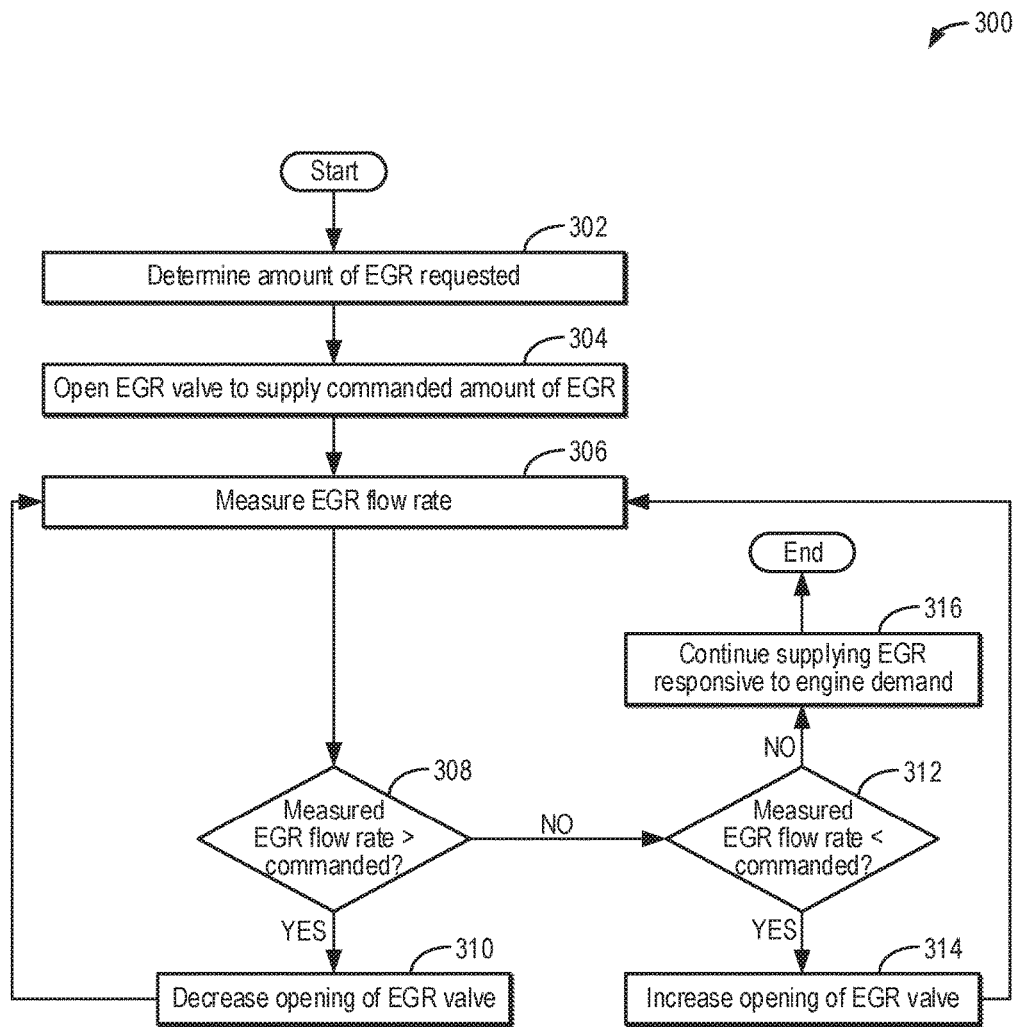
FIG. 3 depicts an example method for EGR control in an engine.
Figure 4:
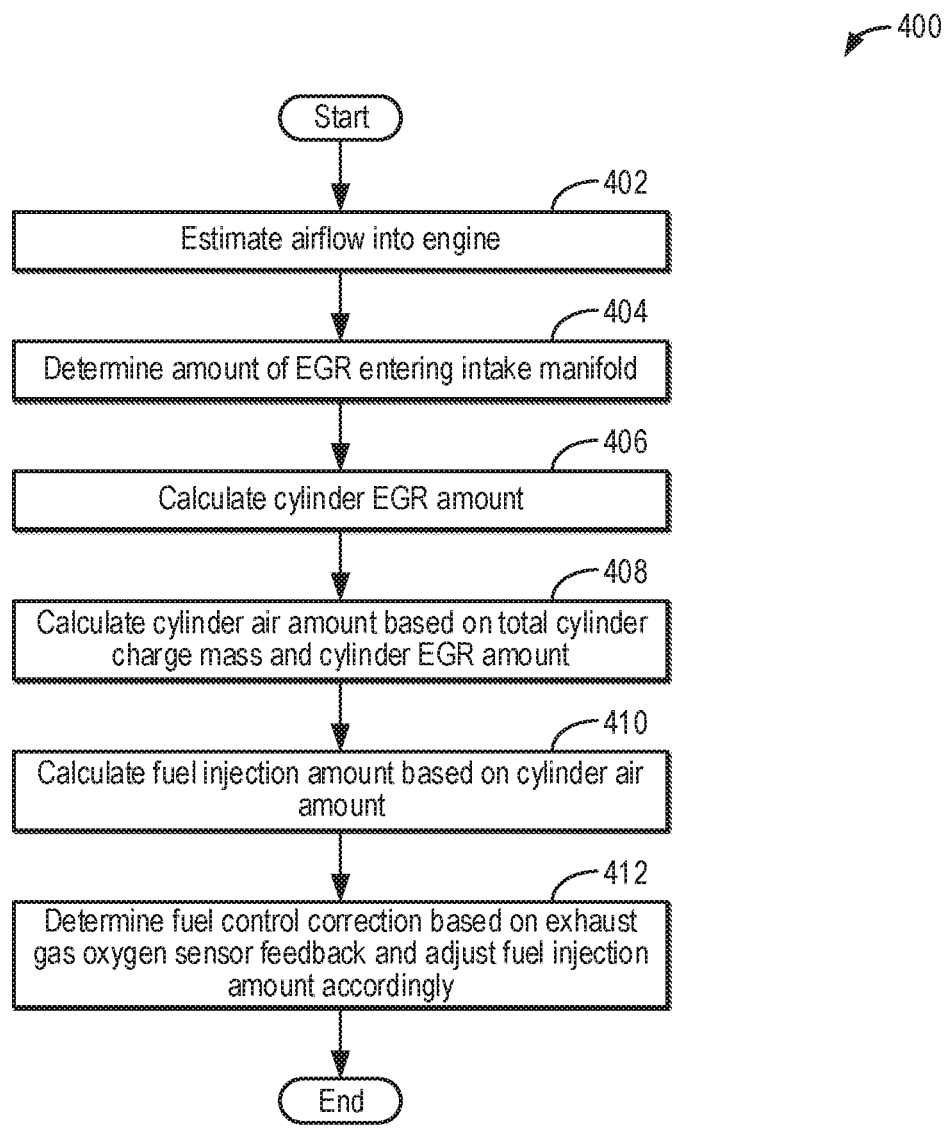
FIG. 4 is an example method for air-fuel control in an engine.

If it is determined that EGR is desired at 204, method 200 proceeds to 208 and includes supplying a commanded amount of EGR, as described further with respect to FIG. 3. Briefly, the commanded amount of EGR (or EGR flow rate) may be determined based on engine speed and load, and the EGR valve may be opened to a position corresponding to the commanded amount of EGR. Further, the EGR differential pressure sensor may be used to measure an actual flow rate of the EGR, thereby providing an indication of the actual EGR amount and/or providing feedback for controlling the position of the EGR valve.

At 210, method 200 includes adjusting fueling based on the amount of EGR, as described further with respect to FIG. 4. Briefly, the amount of EGR and a cylinder charge mass may be used to determine an amount of fresh air within the cylinder, which is then used to generate a fuel command that will give a desired AFR.

At 212, it is determined if knock is detected. As described with respect to FIG. 1, knock may be detected based on output of a knock sensor (e.g., knock sensor 90 of FIG. 1) combined with output of a crankshaft acceleration sensor obtained during a defined knock window. For example, knock may be detected in a cylinder if the output of the knock sensor, sensed in a crank angle window after a spark event in the cylinder, is greater than a knock threshold.

If knock is not detected, method 200 proceeds to 222 and includes continuing to supply EGR responsive to engine demand. For example, a requested amount of EGR may continue to be determined based on engine operating conditions and provided by adjusting the EGR valve to a corresponding position. Following 222, method 200 ends.

If knock is detected at 212, method 200 proceeds to 214 and includes retarding spark timing to provide knock adaptive spark retard. For example, spark timing may be retarded from an original timing selected based on engine operating conditions, including engine speed, engine load, AFR, and EGR amount. By retarding spark timing responsive to an indication of knock, in-cylinder pressures may be decreased, thereby decreasing the propensity for further knock. An amount of spark retard applied may be determined based on the original spark timing and further based on the indication of knock. For example, as the indication of knock increases (e.g., as the output of the knock sensor further exceeds the knock threshold), the amount of spark retard applied may be increased. As another example, when the original spark timing is closer to maximum brake torque (MBT), the amount of spark retard applied may be increased. In one example, spark timing may be retarded by 1-2 crank angle degrees responsive to the indication of knock. As knock is not expected when EGR is being used, the occurrence of knock in the presence of EGR is indicative of errors (e.g., a drop) in EGR flow, such as due to a disconnection of the upstream hose of the EGR differential pressure sensor.

At 216, it is determined if spark retard usage is at a limit. That is, it may be determined if spark retard usage is hitting a clip (e.g., a spark retard threshold). The limit may define a spark retard amount beyond which engine power losses, overheating tendencies, and high emissions may occur. Spark may not be further retarded from the limit. In addition, adaptive spark retard approaching or being at a limit may be indicative of a high knock incidence. If spark retard reaches the clip, a first criterion indicative of potential EGR system degradation due to disconnection of an upstream hose of the EGR differential pressure sensor may be considered met.

If the spark retard usage is not at the limit, method 200 returns to 212 and includes determining if knock is detected, as described above. Thus, spark may be incrementally retarded to a greater degree responsive to knock being detected until the spark retard usage is at the limit.

If the spark retard usage is at the limit at 216, method 200 proceeds to 218 and includes integrating knock intensity over a duration. For example, the duration may correspond to a pre-determined number of engine cycles following the spark retard usage hitting the clip. In another example, the duration may correspond to a pre-determined number of engine cycles following the initial detection of knock.

At 220, it is determined if the integrated knock intensity is greater than a threshold intensity. For example, the threshold intensity may correspond to an amount above which, it may be determined that knock is still prevalent despite the mitigating action of retarding spark as much as can be afforded. Further, the threshold intensity may correspond to an intensity above which it may be determined that knock is occurring more than expected for the given engine operating conditions, and that the higher than expected knock may be triggered by the actual engine dilution being lower than the commanded engine dilution due to degradation of a component of the EGR system. As an example, based on engine knock history, and further based on engine speed-load conditions, there may be an expected propensity for knock, such as an expected percentage of engine cycles with knock occurring while operating at borderline spark timing. Based on the expected knock propensity and the duration over which the knock intensity is integrated, a corresponding threshold intensity may be determined. If the integrated knock intensity reaches or exceeds the threshold intensity, a second, additional criterion indicative of potential EGR degradation due to disconnection of an upstream hose of the EGR sensor may be considered met. If the integrated knock intensity is not greater than the threshold intensity, method 200 proceeds to 222, as described above. Thus, it may be assumed that retarding spark has successfully mitigated knock.

If the integrated knock intensity is greater than the threshold intensity, method 200 proceeds to 224 and includes determining a fuel control correction. The fuel control correction corresponds to an amount of fuel that is added to or subtracted from a base fuel command, for example, due to feedback from an exhaust gas oxygen sensor (e.g., UEGO sensor 126 of FIG. 1) concerning the AFR of combusted gas in order to achieve a desired (e.g., commanded) AFR. In one example, the commanded AFR is stoichiometry. A fuel control module of the engine controller may feed-forward determine a fuel mass to command to a fuel injector based on a charge mass calculation for the cylinder so as to operate the cylinder at stoichiometry (or another target AFR). The charge mass calculation may account for an amount of fresh air being received in the cylinder as well as an amount of exhaust gas being recirculated into the cylinder from the exhaust manifold. In particular, the fuel mass commanded may be commensurate with the fresh air component of the charge mass. Based on feedback from an exhaust AFR sensor, the commanded fuel mass may then be further adjusted. For example, if the output of the AFR sensor is indicative of a leaner than commanded AFR, a subsequent fuel command may have a larger fuel pulse-width. Herein, the enrichening is adjusted based on the difference between the commanded stoichiometric AFR and the measured leaner than stoichiometric AFR. As another example, if the output of the AFR sensor is indicative of a richer than commanded AFR, a subsequent fuel command may have a smaller fuel pulse-width. Herein, the enleaning is adjusted based on the difference between the commanded stoichiometric AFR and the measured richer than stoichiometric AFR.

At 226, it is determined if the fuel control correction is greater than a threshold enrichment. For example, the threshold enrichment may correspond to an enrichment amount above which, it may be determined that the engine is running significantly leaner (e.g., above a threshold AFR) than indicated by the determined air charge. In some examples, the threshold enrichment may refer to a fuel adjustment that would account for EGR not being provided to the engine. In an illustrative example, if the EGR flow is displacing 5% of the airflow, then the threshold enrichment is equal to an amount of fuel that would be delivered for 5% more airflow. As mentioned above and described in greater detail with respect to FIG. 4, the air charge may be determined, in part, based on the EGR flow rate. Thus, if the EGR flow rate is incorrectly high, for example, due to a disconnected upstream hose of the EGR differential pressure sensor, the fuel controller may calculate the fuel command based on an incorrectly low determined air charge, leading to a large fuel control correction enrichment in order to achieve the desired AFR. If the fuel correction enrichment exceeds the threshold enrichment, a third, additional criterion indicative of potential EGR degradation due to disconnection of an upstream hose of the EGR sensor may be considered met. As one example, the controller may integrate the knock intensity of cylinder knocking cycles over a number of combustion events. If the number of knocking cycles is larger than an expected threshold percentage of knocking cycles, the enrichment applied may be greater than or equal to the adjustment needed to account for knocking if the EGR mass were not present. Thus, if EGR mass was displacing 5% of the airflow when working properly, then the enrichment applied may be equal to or greater than 5% (assuming all fuel adaptation is mature). If the fuel control correction is not greater than the threshold enrichment, method 200 proceeds to 228 and includes increasing the amount of EGR and/or performing one or more knock mitigation actions, such as enriching fuel to reduce knock. For example, by increasing the amount of EGR, combustion temperatures may be decreased, which may reduce the occurrence of knock. In another example, rich fuel conditions may reduce the occurrence of knock due to the evaporative cooling effects of the additional fuel. In still further examples, engine load may be temporarily limited by reducing intake airflow to reduce knock incidence. Following 228, method 200 ends.

If the fuel control correction is greater than the threshold enrichment, method 200 proceeds to 230 and includes indicating EGR system degradation responsive to each of the first, second, and third criteria for EGR degradation being met. Responsive to the indication of degradation, the method includes closing the EGR valve. By closing the EGR valve, EGR flow may be reduced to a zero flow rate. For example, it may be inferred that the EGR system may be degraded due to a disconnected upstream hose of the EGR differential pressure sensor. Since the EGR flow rate cannot be reliably determined, commanding the EGR valve closed responsive to the indication of degradation ensures that no EGR flows through the EGR passage to the intake manifold. Indicating EGR system degradation may include setting a diagnostic trouble code (DTC) and may further include illuminating a malfunction indicator lamp (MIL) to alert a vehicle operator of the degradation condition. Further, an amount of internal EGR may be increased by increasing an amount of intake valve and exhaust valve overlap (such as by actuating a variable valve timing mechanism) in order to retain exhaust gas in the cylinder for dilution effects and reduced emissions.

In some examples, the integrated knock intensity may be compared to a first threshold at 220, wherein the first threshold is a threshold integrated knock intensity of the engine operating at borderline. For example, if the integrated knock intensity indicates that 102% of the combustion cycles are knocking while the cylinders are operated at borderline, it may be determined that the first threshold has been exceeded. In some examples, the first threshold may be adjusted based on a flow rate of the EGR that was commanded during engine operation (at 208) and a knock history of the engine (reflective of the engine's propensity for knock). The fuel correction may be compared to a second threshold at 226, wherein the second threshold is a threshold fuel enrichment based on the flow rate of the EGR and a determined air charge. For example, if there is no EGR system degradation, the enrichment amount correction is expected to be approximately equal to the air flow correction needed (by opening up the throttle) to account for the commanded EGR flow rate. If the enrichment correction exceeds the air flow correction for the commanded EGR flow rate, EGR system degradation may be possible.

At 232, method 200 includes, after disabling EGR, setting the spark timing and fueling for zero EGR. For example, spark timing may be advanced when EGR is requested to compensate for a reduced in-cylinder temperature and pressure due to EGR. Thus, when zero EGR is delivered responsive to the indication of degradation, the base spark timing may be retarded relative to the base spark timing when EGR is delivered. For example, the controller may refer a look-up table with engine operating conditions (e.g., engine speed and load, ECT, MAP, and air temperature) as the input and output the base spark timing. Further, with zero EGR, the air charge is not diluted. Therefore, the amount of fuel delivered is increased compared to when EGR is provided in order to achieve a desired AFR, which may be calculated according to the method of FIG. 4, for example. Note that as used herein, disabling EGR and providing no EGR (or zero EGR) refers to external EGR and not to internal EGR.

At 234, method 200 includes triggering a dedicated EGR differential pressure sensor monitor responsive to the indication of degradation. For example, the controller may perform an EGR differential pressure sensor upstream hose diagnostic, as described with respect to FIG. 5. For example, method 200 non-intrusively indicates that there is possible degradation of the upstream hose, which may be confirmed with a more active, intrusive monitor. While the EGR differential pressure sensor upstream hose diagnostic is typically performed once per drive cycle, the adaptive spark retard reaching the spark retard limit (as determined at 216), the integrated knock intensity being greater than the threshold intensity (as determined at 220), and the fuel control correction being greater than the threshold enrichment (as determined at 226) trigger the upstream hose diagnostic to be performed even if it has already been performed during the drive cycle or is not scheduled. Thus, the intrusive monitor allows the controller to determine if the upstream hose became disconnected after the last time the monitor was performed. Following 234, method 200 ends.

It will be appreciated that while the method of FIG. 2 discloses EGR degradation being determined responsive to each of multiple criteria being met, viz., a propensity for engine knock, adaptive spark retard reaching a limit, and a fuel control correction surpassing a threshold, in alternate examples, degradation may be determined based on at least one of the criteria being met. For example, degradation may be inferred responsive to adaptive spark retard reaching the limit, even while engine knock and the fuel control correction remain below their thresholds.

Continuing to FIG. 3, an example method 300 for controlling an amount of EGR delivered to an engine, such as engine 10 of FIG. 1, is shown. For example, method 300 may be performed by a controller (e.g., controller 12 of FIG. 1) as part of method 200 of FIG. 2 (e.g., at 208) once it is determined that EGR is requested, such as when the engine is operating at low to mid loads and after the engine is warmed up.

Method 300 begins at 302 and includes determining an amount of EGR requested. For example, the controller may refer to a look-up table having the engine speed and load as the input and output a dilution amount corresponding to the input engine speed-load. In another example, the controller may determine the EGR amount (e.g., EGR flow rate) through logic rules that directly take into account parameters such as engine load, engine speed, engine temperature, etc. In still other examples, the controller may rely on a model that correlates a change in engine load with a change in a dilution requirement, and further correlates the change in the dilution requirement with a change in the amount of EGR requested. For example, as the engine load increases from a low load to a mid load, the amount of EGR requested may increase, and then as the engine load increases from a mid load to a high load, the amount of EGR requested may decrease. The controller may further determine the amount of EGR requested by taking into account a best fuel economy mapping for a desired dilution rate.

At 304, method 300 includes opening an EGR valve to supply the commanded (e.g., requested) amount of EGR. For example, the controller may refer to a look-up table having the requested amount of EGR as the input and having a signal corresponding to a degree of opening to apply to the EGR valve as the output. As an example, as the requested amount of EGR increases, the opening of the EGR valve may be increased. Thus, the EGR valve (e.g., EGR valve 142 of FIG. 1) may be actuated open to a position corresponding to the requested EGR flow rate.

At 306, method 300 includes measuring the EGR flow rate. As described with respect to FIG. 1, the EGR flow rate may be measured using a differential pressure sensor (e.g., differential pressure sensor 144 of FIG. 1). Alternatively, the EGR flow rate may be inferred by one or more temperature, pressure, humidity, and air-fuel ratio sensors.

At 308, it is determined if the measured EGR flow rate is greater than commanded (or if the measured EGR flow rate exceeds the commanded flow rate by more than a threshold amount). In one example, the measured EGR flow rate may be accumulated for a pre-determined duration and compared to the commanded EGR flow rate accumulated over the same duration. Alternatively, the measured EGR flow rate may be compared to a first threshold flow rate, the first threshold flow rate set based on the commanded EGR flow rate such that if the measured EGR flow rate is greater than the first threshold flow rate, the amount of EGR being delivered to the engine is greater than desired.

If the measured EGR flow rate is greater than commanded, method 300 proceeds to 310 and includes decreasing the opening of the EGR valve. By further closing the EGR valve, the amount of EGR delivered is reduced. For example, the controller may refer a look-up table having a difference between the commanded EGR flow rate and the measured EGR flow rate as the input and a signal corresponding to a new, decreased degree of opening to apply to the EGR valve as the output. In still other examples, the controller may rely on a model that correlates the difference between the commanded EGR flow rate and the measured EGR flow rate with a change in the EGR valve position and further correlates the change in the EGR valve position with a signal to apply to the EGR valve. Following 310, method 300 may return to 306 to measure the EGR flow rate.

Returning to 308, if the measured EGR flow rate is not greater than commanded, method 300 proceeds to 312 and includes determining if the measured EGR flow rate is less than commanded. As at 308, in one example, the measured EGR flow rate may be accumulated for the pre-determined duration and compared to the commanded EGR flow rate accumulated over the same duration. Alternatively, the measured EGR flow rate may be compared to a second threshold flow rate, the second threshold flow rate set based on the commanded EGR flow rate such that if the measured EGR flow rate is less than the second threshold flow rate, the amount of EGR being delivered to the engine is less than desired. Thus, the first threshold flow rate (as described at 308) and the second threshold flow rate may define a range between which the measured EGR flow rate is considered to be equal to the commanded EGR flow rate.

If the measured EGR flow rate is less than commanded (or if the measured EGR flow rate falls below the commanded flow rate by more than the threshold amount), method 300 proceeds to 314 and includes increasing the opening of the EGR valve. By further opening the EGR valve, the amount of EGR delivered is increased. For example, the controller may refer a look-up table having a difference between the commanded EGR flow rate and the measured EGR flow rate as the input and a signal corresponding to a new, increased degree of opening to apply to the EGR valve as the output. In still other examples, the controller may rely on a model that correlates the difference between the commanded EGR flow rate and the measured EGR flow rate with a change in the EGR valve position and further correlates the change in the EGR valve position with a signal to apply to the EGR valve. Following 314, method 300 may return to 306 to measure the EGR flow rate, as described above. Thus, the position of the EGR valve may be iteratively adjusted until the measured EGR flow rate is equal to the commanded EGR flow rate.

If, at 312, the measured EGR flow rate is not less than commanded, if may be assumed that the EGR flow rate is considered to be substantially equal to the commanded EGR flow rate (or within a threshold of the commanded EGR flow rate). Therefore, method 300 proceeds to 316 and includes continuing to supply EGR responsive to engine demand. For example, the current position of the EGR valve may be maintained until engine operating conditions change, such as the engine load changing responsive to a change in driver demand, at which time the position of the EGR valve may be updated to provide a new commanded amount of EGR. Following 316, method 300 ends.

Thus, FIG. 3 provides a method for determining an EGR amount to provide to an engine, measuring an EGR flow rate as an indication of the amount of EGR actually being delivered to the engine, and iteratively adjusting the EGR valve if the amount of EGR being delivered to the engine is not equal to the desired amount. In this way, the amount of EGR being delivered to the engine may be precisely controlled for increased emissions control. However, inaccuracies in determining the EGR flow may directly affect estimated cylinder air charge, leading to inaccuracies in calculated fuel injection and degraded AFR control, as described below.

FIG. 4 shows an example method 400 for determining an amount of fuel to inject into cylinders of an engine (e.g., generating a fuel command). Additionally, an exhaust gas oxygen sensor, such as UEGO sensor 126 of FIG. 1, may be used to measure the AFR of exhaust gas, thereby providing feedback for the fuel command, as described further below. Method 400 may be performed as part of method 200 of FIG. 2, such as at 210. Further, method 400 may be executed synchronously with engine firing (e.g., once per engine firing event). Method 400 may be performed by an engine controller, such as controller 12 of FIG. 1. For example, method 400 may be performed by a fuel control module of the engine controller. In another example, all or some of method 400 may be performed by a dedicated fuel controller that is communicatively coupled to the engine controller. While FIG. 4 depicts a speed-density method for estimating air flow into the engine, such as based on output of a MAP sensor (e.g., MAP sensor 122 of FIG. 1) coupled to an intake manifold of the engine, in other examples, output of a MAF sensor (e.g., MAF sensor 120 of FIG. 1) may be used in generating the fuel command.

Method 400 begins at 402 and includes estimating airflow into the engine. The airflow into the engine refers to a sum of an amount of EGR and an amount of fresh air entering the engine and may be determined based on a plurality of engine operating parameters, such as engine speed, MAP (as measured using the MAP sensor), manifold temperature, engine displacement, and engine volumetric efficiency. For example, a controller (e.g., controller 12 of FIG. 1) may input the plurality of engine operating parameters into an equation and output the airflow into the engine. Further, the airflow may be divided by the number of engine cylinders to determine a total cylinder charge mass.

At 404, method 400 includes determining the amount of EGR entering the intake manifold. The amount of EGR (e.g., an EGR charge) entering the intake manifold may be determined based on an EGR flow rate, such as measured with an EGR differential pressure sensor (e.g., differential pressure sensor 144 of FIG. 1), as described with respect to FIG. 3.

At 406, method 400 includes calculating a cylinder EGR amount. For example, the cylinder EGR amount may be determined by dividing the EGR charge entering the intake manifold by the number of engine cylinders and engine speed.

At 408, method 400 includes calculating a cylinder air amount based on the total cylinder charge mass and the cylinder EGR amount. For example, the controller may calculate the cylinder air amount by subtracting the cylinder EGR amount (as determined at 406) from the total cylinder charge mass (as determined at 402).

At 410, method 400 includes calculating a fuel injection amount based on the cylinder air amount. The fuel injection amount refers to an amount of fuel that will achieve a desired AFR given the cylinder air amount. For example, the controller may calculate the fuel injection amount by dividing the cylinder air amount by the desired AFR. The controller may then generate a signal with a pulse width corresponding to the fuel injection amount to send to fuel injectors. In one example, the desired AFR is stoichiometry.

At 412, method 400 includes determining a fuel control correction based on exhaust gas oxygen sensor feedback and adjusting the fuel injection amount accordingly. The exhaust gas oxygen sensor may measure a concentration of oxygen in the exhaust gas, which may then be used to determine the AFR of the exhaust gas. If the AFR of the exhaust gas is leaner than the desired AFR, the fuel control correction may include increasing the fuel injection amount, such as by increasing a fuel pulse-width on the next fuel injection event. If the AFR of the exhaust gas is richer than the desired AFR, the fuel control correction may include decreasing the fuel injection amount, such as by decreasing the fuel pulse-width on the next fuel injection event. The degree to which the fuel injection amount is increased (enriched) or decreased (enleaned) may be proportional to the amount of deviation of the determined AFR of the exhaust gas from the desired AFR. Thus, the fuel injection amount may be controlled in a closed-loop manner. Following 412, method 400 ends.

As can be seen from the above methods, in particular method 400 of FIG. 4, if a determined cylinder EGR amount is larger than the actual cylinder EGR amount, the engine will be fueled as if there is little air charge, making the system lean. Thus, based on AFR feedback from an exhaust gas oxygen sensor, the fuel control will be corrected, increasing a fuel injection amount (e.g., fuel pulse-width). The fuel control correction being above a threshold enrichment may indicate that the determined cylinder EGR amount is larger than the actual cylinder EGR amount, particularly when combined with a high knock intensity and adaptive spark retard hitting a limit, as described with respect to FIG. 2. Thus, the EGR system may be determined to be degraded and therefore disabled. The determined cylinder EGR amount may be larger than the actual cylinder EGR amount due to a disconnected upstream hose of an EGR differential pressure sensor causing a large delta pressure measurement, for example. Thus, disconnection of the upstream hose may be confirmed using an intrusive monitor.

Figure 5:
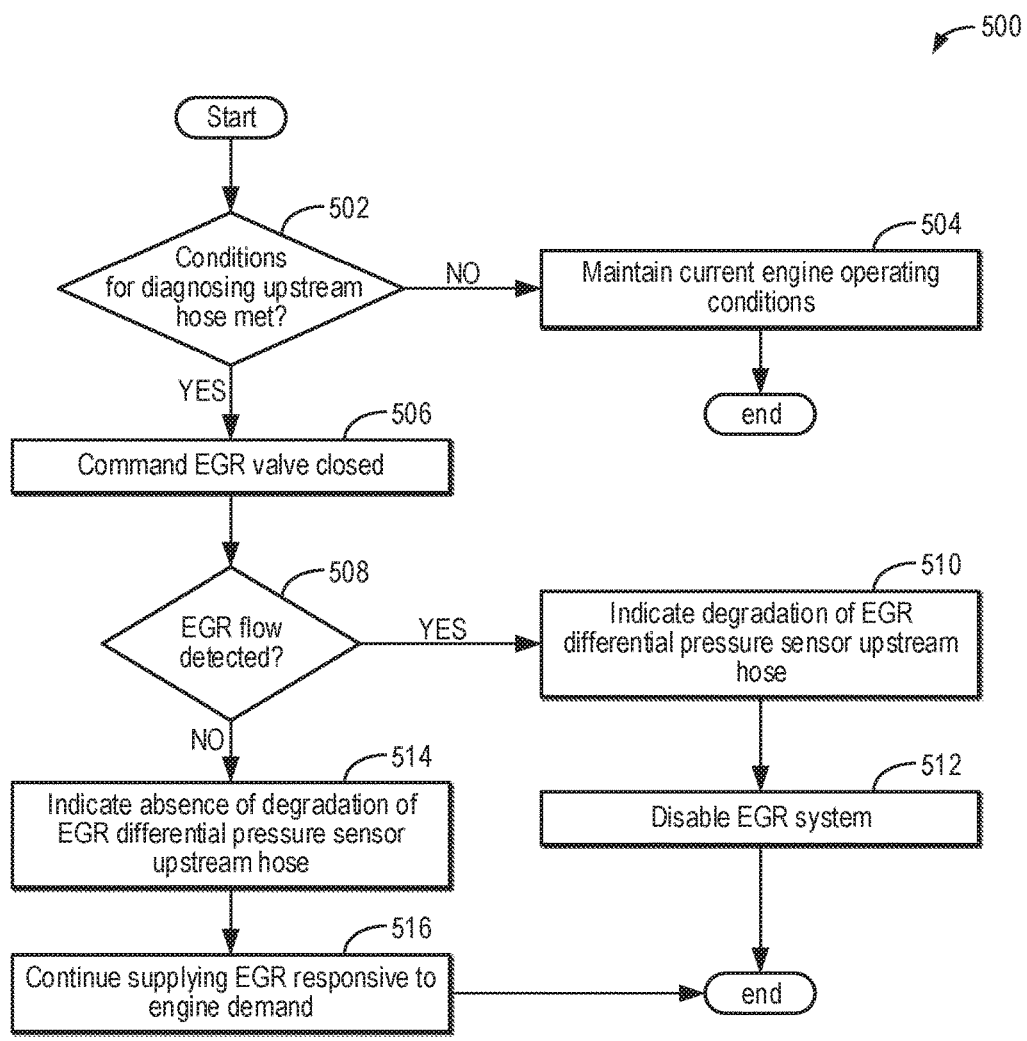
FIG. 5 shows an example method for determining degradation of an EGR differential pressure sensor due to a disconnected upstream hose.
Figure 6:
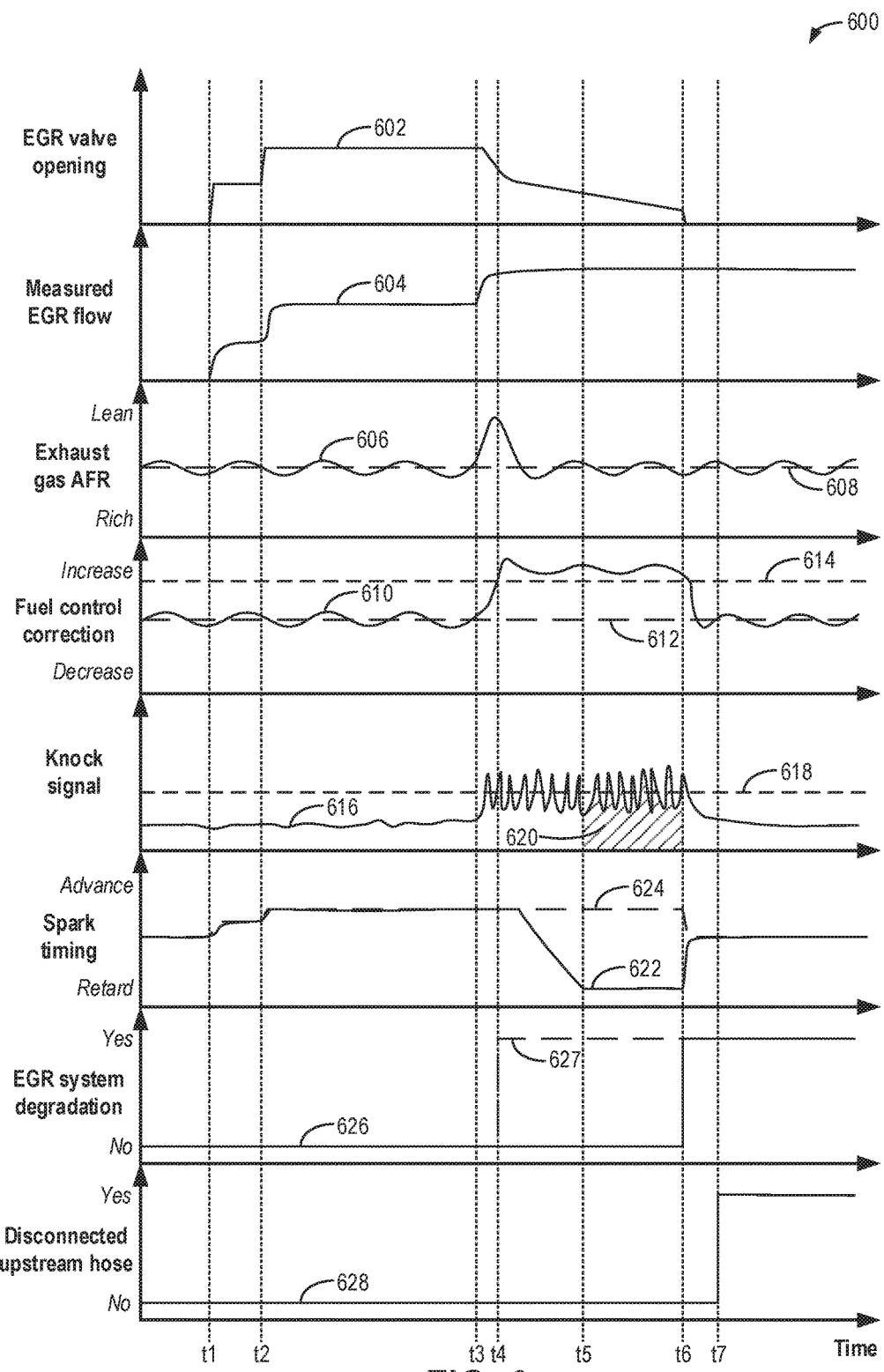
FIG. 6 is a prophetic example of adjusting engine operation responsive to an indication of EGR system degradation due to a disconnected upstream hose of an EGR differential pressure sensor.

FIG. 5 shows an example method 500 for diagnosing an upstream hose of an EGR differential pressure sensor (e.g., differential pressure sensor 144 of FIG. 1) in a vehicle. Method 500 may be performed by a controller (e.g., controller 12 of FIG. 1) as part of method 200 of FIG. 2 (e.g., at 234), for example. In other examples, method 500 may be performed once per drive cycle in accordance with general on-board diagnostics. It will be appreciated that the method of FIG. 5 may also be referred to herein as an EGR upstream hose monitor.

Method 500 begins at 502 and includes determining if conditions for diagnosing the upstream hose are met. In one example, the conditions may be considered met if a threshold duration or distance of vehicle travel has elapsed since a last diagnosis of the upstream hose. In another example, conditions for diagnosing the upstream hose may be considered met if the vehicle is undergoing conditions that can trigger the dislocation of the hose, such as an acceleration event, rough road conditions, vehicle travel on a slope (uphill or downhill), windy conditions, and extended duration of vehicle operation at higher than threshold vehicle speeds.

If conditions for diagnosing the upstream hose are not met, method 500 proceeds to 504 and includes maintaining current engine operating conditions. For example, EGR conditions may be maintained, and the upstream hose of the EGR differential pressure sensor is not intrusively diagnosed. However, as elaborated with reference to FIG. 2, engine operating conditions may continue to be monitored, allowing for the EGR differential pressure sensor to be opportunistically and non-intrusively diagnosed during engine operation. If method 500 was performed responsive to an indication of EGR system degradation (e.g., as at 234 of FIG. 2), the EGR valve may remain closed at the onset of the monitor following the indication of degradation. If method 500 was performed as a part of general on-board diagnostics, the EGR system may remain enabled, with EGR supplied responsive to engine demand (as elaborated with respect to FIG. 3). Following 504, method 500 ends.

If conditions for diagnosing the upstream hose are met, method 500 proceeds to 506 and includes commanding the EGR valve closed. For example, if the EGR valve is open and exhaust gas is being supplied to an intake manifold of the engine via an EGR passage, the EGR valve will be closed, temporarily disrupting the flow of exhaust gas to the intake manifold. If the EGR valve is already closed, then the EGR valve is maintained closed throughout the monitor. Herein, closing the EGR valve includes fully closing the EGR valve.

At 508, it is determined if EGR flow is detected. If the EGR system is functioning nominally, no flow is expected with the EGR valve closed. The EGR differential pressure sensor may be used to measure an amount of EGR flowing through the EGR valve and output a voltage signal corresponding to the amount, as further described with respect to FIG. 1. Therefore, if the voltage output of the EGR differential pressure sensor indicates a positive EGR flow (e.g., a delta pressure is less than a threshold), it may be determined that EGR flow is detected, and method 500 proceeds to 510.

At 510, method 500 includes indicating degradation of the EGR differential pressure sensor upstream hose. For example, it is indicated that the upstream hose may be disconnected from the EGR passage or the differential pressure sensor, making the pressure at an upstream port of the differential pressure sensor equal to atmospheric pressure. This creates a pressure differential between the upstream port and a downstream port, which results in EGR flow being measured even when the EGR valve is closed and EGR is not flowing. Indicating degradation of the upstream hose may include the controller setting a DTC and may further include illuminating a MIL to alert a vehicle operator of the degradation condition.

At 512, method 500 includes disabling the EGR system. Disabling the EGR system includes commanding the EGR valve fully closed and not allowing EGR to be commanded even if engine dilution is required. For example, with a disconnected upstream hose, exhaust gases may escape to the atmosphere instead of being routed to the intake manifold. Thus, EGR cannot be relied upon to supply a desired engine dilution, and so the EGR system may be disabled until the DTC is cleared. Without EGR, fuel enrichment may be used to reduce peak cylinder temperatures, for example. In addition, engine dilution may be provided via alternate approaches, such as internal EGR (e.g., by increasing valve overlap using a variable valve timing mechanism). In another example, if the engine system includes a water injection system, water injection may be used, such as by injecting water into the intake manifold or directly in-cylinder, to dilute the air charge and/or provide evaporative cooling effects.

If EGR flow is not detected at 508 (e.g., the voltage output of the EGR differential pressure sensor is consistent with a no flow condition), method 500 proceeds to 514 and includes indicating an absence of degradation of the EGR differential pressure sensor upstream hose. With the EGR valve closed and the upstream hose and a downstream hose of the EGR pressure sensor both connected, the pressure differential between the upstream and downstream ports of the EGR pressure sensor is equal to 0. Therefore, EGR flow not being detected shows that the upstream hose is connected to both the EGR passage and the differential pressure sensor.

At 516, method 500 includes continuing to supply EGR responsive to engine demand. For example, if the EGR valve was closed to test the EGR differential pressure sensor upstream hose, it may be actuated open to an appropriate position for an amount of EGR requested, as described further with respect to FIG. 3. Following 516, method 500 ends.

Thus, the upstream hose of an EGR differential pressure sensor may be diagnosed in a timely fashion responsive to an indication of EGR system degradation in which more EGR flow is measured than is actually delivered. Quickly diagnosing a disconnected upstream hose may streamline the diagnostic and repair procedure.

FIG. 6 shows a graph 600 of an example timeline for detecting EGR system degradation due to a disconnected upstream hose of a differential pressure sensor and adjusting fueling and spark timing accordingly. Specifically, in the example of FIG. 6, two criteria are used to determine EGR system degradation, such as according to method 200 of FIG. 2. An EGR valve opening is shown in plot 602, a measured EGR flow is shown in plot 604, an exhaust gas AFR is shown in plot 606, a fuel control correction is shown in plot 610, a knock signal is shown in plot 616, spark timing is shown in plot 622, an indication of EGR system degradation is shown in plot 626, and an indication of a disconnected upstream hose of an EGR differential pressure sensor is shown in plot 628. Furthermore, dashed line 608 represents an exhaust gas AFR of stoichiometry, above which the AFR is lean and below which the AFR is rich; dashed line 612 represents a fuel control correction of zero, above which fuel is added to a base fuel command and below which fuel is subtracted from the base fuel command in order to achieve a desired AFR; dashed line 614 represents a threshold fuel control correction enrichment for determining EGR system degradation; dashed line 618 represents a knock threshold; and dashed line 624 represents MBT spark timing. For all of the above, the X-axis represents time, with time increasing along the X-axis from left to right. The Y-axis represents the labeled parameter, with values increasing from bottom to top, except for plots 626 and 628, in which EGR system degradation (plot 626) and the disconnected upstream hose (plot 628) are indicated as "yes" or "no."

Prior to t1, the engine is operated without EGR requested. For example, EGR may not be requested due to the engine operating at a high load. As shown in plot 602, with no EGR requested, an EGR valve (e.g., EGR valve 142 of FIG. 1) is closed. In the example of FIG. 6, EGR flow is determined using an EGR differential pressure sensor, such as differential pressure sensor 144 of FIG. 1. With the EGR valve closed, the differential pressure sensor measures a no flow condition (plot 604). The exhaust gas AFR (plot 606), as measured by an exhaust gas oxygen sensor (e.g., UEGO sensor 126 of FIG. 1), fluctuates about stoichiometry (dashed line 608), with the fuel control correction (plot 610) increasing or decreasing fueling in response to the AFR fluctuation. The knock signal (plot 616), as output by a knock sensor (e.g., knock sensor 90 of FIG. 1) remains below a knock threshold (dashed line 618), indicating that knock is not occurring. Thus, spark timing (plot 622) is set to MBT (dashed line 624). EGR system degradation (plot 626), including degradation due to a disconnected upstream hose of the EGR differential pressure sensor (plot 628), is not indicated.

Beginning at t1, EGR is requested responsive to the engine load decreasing (not shown). Thus, the EGR valve is opened to a first open position (plot 602). As the EGR valve is opened, the measured EGR flow (plot 604) also increases. A base fuel command is adjusted to take into account the amount of EGR entering the engine, as described with respect to FIG. 4. Thus, the exhaust gas AFR continues to fluctuate about stoichiometry, as shown in plot 606, with the fuel control correction (plot 610) responding accordingly. Further, MBT (dashed line 624) is advanced relative to when no EGR is provided, with spark timing (plot 624) advancing accordingly to remain at MBT. The knock signal (plot 616) remains below the knock threshold (dashed line 618).

At t2, the amount of EGR requested increases, for example, responsive to the engine load further decreasing. The EGR valve is further opened to a second open position (plot 602). The measured EGR flow (plot 604) increases accordingly. MBT spark timing (dashed line 624) is further advanced in response to the increased amount of EGR, and the actual spark timing (plot 622) is further advanced to remain at MBT. The exhaust gas AFR (plot 606) continues to fluctuate nominally about stoichiometry (dashed line 608). The knock signal (plot 616) remains below the knock threshold (plot 618). Further, EGR system degradation is not indicated (plot 628).

At t3, the measured EGR flow increases (plot 604) despite the EGR valve position remaining constant (plot 602). In the example of FIG. 6, at t3, the upstream hose of the EGR differential pressure sensor disconnects, making it appear as if a large amount of EGR is entering the engine. A controller may use the measured EGR flow as feedback for adjusting the position of the EGR valve in order to achieve a desired EGR flow, as described with respect to FIG. 3. Therefore, responsive to the measured EGR flow increasing, the EGR valve is further closed in an attempt to achieve the amount of EGR requested. However, the measured EGR flow does not decrease as the EGR valve opening decreases. Further, the exhaust gas AFR (plot 606) becomes lean. Knock is detected, for example, due to the lean fueling conditions, as shown by the knock signal (plot 616) surpassing the knock threshold (dashed line 618). In order to achieve the desired AFR (e.g., stoichiometry), the fuel control correction (plot 610) increases, adding additional fuel to the base fuel command, which is determined in part based on the measured EGR flow. The fuel control correction surpasses the threshold fuel control correction enrichment (dashed line 618) at t4. Therefore, if only one criterion for determining EGR system degradation is being used instead of both criteria, as described with respect to FIG. 2, EGR system degradation may be indicated at t4 (dashed segment 627).

Between t4 and t5, the exhaust gas AFR returns to fluctuating about stoichiometry (plot 606) due to the exhaust gas AFR being used as feedback for the fuel control correction. In order to maintain an AFR around stoichiometry, the fuel control correction (plot 610) remains above the threshold enrichment (dashed line 614), as the inaccurately large measured EGR flow (plot 604) continues to influence the base fuel command. In response to continued knock (plot 616), for example, due to a desired engine dilution not being achieved, spark timing is retarded from MBT, as shown in plot 622. At t5, spark retard usage reaches a limit from which it cannot be further reduced. Therefore, the controller integrates the knock intensity over a duration spanning from t5 to t6. The integrated knock intensity, indicated by shaded area 620, is greater than a threshold intensity (not shown). Thus, the two criteria are met, and at t6, EGR system degradation is indicated by setting a flag (plot 626) and the EGR system is disabled.

In response to EGR system degradation being indicated at t6, the EGR valve is commanded closed (plot 602) and spark timing and fueling are set for zero EGR. For example, MBT (dashed line 624) is set for zero EGR, which may be less advanced than when EGR is requested. Spark timing (plot 622) is advanced from the spark retard limit so that spark timing occurs at MBT. With fueling set for zero EGR, all of the estimated airflow into the engine is determined to be fresh air, and the base fuel command is generated accordingly. Thus, the fuel control correction (plot 614) is reduced below the threshold enrichment (dashed line 614) and fluctuates about a correction of zero (dashed line 612) based on exhaust gas AFR feedback (plot 606). Further, with the appropriate fueling and spark timing supplied for the engine operating conditions, knock no longer occurs, as shown by the knock signal (plot 616) decreasing below the knock threshold (dashed line 618).

At t7, the controller initiates an EGR differential pressure sensor monitor, such as the method of FIG. 5, responsive to the indication of EGR system degradation and entry conditions for the monitor being met (e.g., a vehicle acceleration condition). With the EGR system disabled and the EGR valve closed (plot 602), an EGR no flow condition is expected. However, the measured EGR flow remains high (plot 604), indicating that the upstream hose of the EGR differential pressure sensor is disconnected. Therefore, a disconnected upstream hose is indicated by setting a flag (plot 628).

In this way, degradation of an EGR system due to disconnection of an upstream hose of an EGR differential pressure sensor may be determined non-intrusively based on a specific combination of changes to engine operating parameters during engine operation. The technical effect of monitoring changes in knock intensity, adaptive spark, and feedback fuel correction for AFR control during engine operation with commanded EGR is that degradation of the EGR system may be accurately predicted using existing sensors. Further, disconnection of the upstream hose of the EGR differential pressure sensor may be diagnosed in a timely fashion if the upstream hose becomes disconnected in between iterations of a dedicated EGR differential pressure sensor monitor. By identifying hose disconnection and addressing the degradation promptly, heavy knock induced by EGR flow errors may be reduced, extending engine component life. Furthermore, by disabling EGR responsive to the indication of hose decoupling, unwanted release of exhaust to the atmosphere through the disconnected hose is reduced, improving exhaust emissions.

As one example, a method is provided, comprising: during engine operation with a commanded amount of EGR, responsive to at least one of an integrated knock intensity of an engine being greater than a threshold intensity and a fuel control correction of fuel supplied to the engine being greater than a threshold enrichment, setting an exhaust gas recirculation (EGR) rate to zero. In the preceding example, additionally or optionally, the integrated knock intensity is determined based on an output of a knock sensor coupled to the engine over a number of engine cycles. In any or all of the preceding examples, additionally or optionally, the fuel control correction is determined based on a difference between a commanded air-fuel ratio (AFR) of the engine and a measured AFR sensed via an exhaust gas oxygen sensor. In any or all of the preceding examples, additionally or optionally, setting the EGR rate to zero includes commanding closed an EGR valve coupled to an EGR passage from an at least partially open position to block exhaust flow from an exhaust system to an intake manifold and continuing to carry out combustion after closing the EGR valve with fueling and spark timing based on operation without EGR. In any or all of the preceding examples, additionally or optionally, the method may further comprise indicating potential EGR system degradation due to detachment of an upstream hose of an EGR differential pressure sensor coupled to the EGR passage. In any or all of the preceding examples, additionally or optionally, the method may further comprise adjusting a spark timing from a current spark timing based on the commanded amount of EGR to an updated spark timing for the zero EGR; adjusting a fuel command from a current pulse-width based on the commanded amount of EGR to an updated pulse-width for the zero EGR; and initiating a monitor for diagnosing an upstream hose of an EGR differential pressure sensor. In any or all of the preceding examples, additionally or optionally, the upstream hose of the EGR differential pressure sensor is fluidically coupled to the EGR passage upstream of a metered orifice. In any or all of the preceding examples, additionally or optionally, the updated spark timing is retarded relative to the current spark timing. In any or all of the preceding examples, additionally or optionally, the updated fuel pulse-width is increased relative to the current fuel pulse-width as a function of a cylinder air amount.

As another example, a method comprises: while operating an engine with EGR, adjusting spark responsive to an indication of knock; responsive to the adjusted spark being retarded to a spark retard threshold, integrating knock sensor output over a number of engine cycles and determining a fuel control correction over the number of engine cycles; and indicating degradation of an EGR system responsive to one or more of the integrated output of the knock sensor being greater than a first threshold and the fuel control correction being greater than a second threshold. In the preceding example, additionally or optionally, the fuel control correction includes a fuel enrichment required to maintain an exhaust air-fuel ratio (AFR) at a target AFR while operating the engine with the EGR. In any or all of the preceding examples, additionally or optionally, the first threshold is a threshold integrated knock intensity of the engine operating at borderline, the first threshold based on a flow rate of the EGR and a knock history of the engine, and the second threshold is a threshold fuel enrichment based on the flow rate of the EGR and a determined air charge. In any or all of the preceding examples, the method additionally or optionally further comprises, in response to the indication of degradation of the EGR system, operating the engine with no EGR while retarding spark timing and increasing a fuel injection amount, the retarded spark timing and increased fuel injection amount corresponding to a zero EGR flow rate. In any or all of the preceding examples, additionally or optionally, operating the engine with no EGR includes fully closing an EGR valve coupling an exhaust passage of the engine to an intake manifold of the engine. In any or all of the preceding examples, the method additionally or optionally further comprises, responsive to the indication of degradation of the EGR system, diagnosing an upstream hose of an EGR differential pressure sensor coupled to the EGR valve. In any or all of the preceding examples, additionally or optionally, diagnosing the upstream hose of the EGR differential pressure sensor includes, while maintaining the EGR valve closed, measuring EGR flow through the EGR system using the EGR differential pressure sensor and indicating a disconnection of the upstream hose of the EGR differential pressure sensor in response to an output of the sensor being greater than a threshold.

As another example, a system is provided, comprising: an engine having a cylinder; an intake manifold and an exhaust system; an EGR system, comprising an EGR passage fluidically coupling the intake manifold to the exhaust system, the EGR passage including a restrictive orifice, an EGR valve coupled to the EGR passage, and a differential pressure sensor for sensing EGR flow, the sensor including an upstream hose coupled to the EGR passage, upstream of the restrictive orifice, and a downstream hose coupled to the EGR passage, downstream of the restrictive orifice; a spark plug for providing spark to the cylinder; a knock sensor; a manifold absolute pressure (MAP) sensor coupled to the intake manifold for estimating an engine airflow; an exhaust gas oxygen sensor coupled to the exhaust system; and a controller configured with computer readable instructions stored on non-transitory memory for: operating the engine with an EGR flow; estimating a cylinder air amount based on each of the engine airflow and the EGR flow; calculating each of a fuel command based on the cylinder air amount and a correction to the fuel command based on exhaust gas oxygen sensor output; calculating a spark timing based in part on the EGR flow; detecting knock based on output of the knock sensor; retarding spark from the determined spark timing in response to knock detection; and indicating potential disconnection of the upstream hose from at least one of the EGR passage and the differential pressure sensor responsive to each of the correction to the fuel command being greater than a threshold enrichment, an integrated output of the knock sensor being greater than a threshold intensity, and spark retard reaching a spark retard threshold. In the preceding example, additionally or optionally, the controller includes further instructions for: responsive to the indication of potential disconnection of the upstream hose, disabling the EGR system and confirming the disconnection of the upstream hose of the differential pressure sensor based on a presence of EGR flow through the EGR passage. In any or all of the preceding examples, additionally or optionally, disabling the EGR system further includes commanding the EGR valve fully closed and setting the EGR flow to zero. In any or all of the preceding examples, additionally or optionally, confirming the disconnection of the upstream hose based on the presence of EGR flow includes measuring a delta pressure across the restrictive orifice with the differential pressure sensor while the EGR valve is maintained closed and indicating disconnection of the upstream hose in response to the delta pressure being lower than a threshold.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
    while operating an engine with EGR, adjusting spark responsive to an indication of knock;
    responsive to the adjusted spark being retarded to a spark retard threshold, integrating knock sensor output over a number of engine cycles and determining a fuel control correction over the number of engine cycles; and
    indicating degradation of an EGR system responsive to one or more of the integrated output of the knock sensor being greater than a first threshold and the fuel control correction being greater than a second threshold.

2. The method of claim 1, wherein the fuel control correction includes a fuel enrichment required to maintain an exhaust air-fuel ratio (AFR) at a target AFR while operating the engine with the EGR.

3. The method of claim 1, wherein the first threshold is a threshold integrated knock intensity of the engine operating at borderline, the first threshold based on a flow rate of the EGR and a knock history of the engine, and the second threshold is a threshold fuel enrichment based on the flow rate of the EGR and a determined air charge.

4. The method of claim 1, further comprising, in response to the indication of degradation of the EGR system, operating the engine with no EGR while retarding spark timing and increasing a fuel injection amount, the retarded spark timing and increased fuel injection amount corresponding to a zero EGR flow rate.

5. The method of claim 4, wherein operating the engine with no EGR includes fully closing an EGR valve coupling an exhaust passage of the engine to an intake manifold of the engine.

6. The method of claim 5, further comprising, responsive to the indication of degradation of the EGR system, diagnosing an upstream hose of an EGR differential pressure sensor coupled to the EGR valve.

7. The method of claim 6, wherein diagnosing the upstream hose of the EGR differential pressure sensor includes, while maintaining the EGR valve closed, measuring EGR flow through the EGR system using the EGR differential pressure sensor and indicating a disconnection of the upstream hose of the EGR differential pressure sensor in response to an output of the sensor being greater than a threshold.

8. A system, comprising:
    an engine having a cylinder;
    an intake manifold and an exhaust system;
    an EGR system, comprising an EGR passage fluidically coupling the intake manifold to the exhaust system, the EGR passage including a restrictive orifice, an EGR valve coupled to the EGR passage, and a differential pressure sensor for sensing EGR flow, the sensor including an upstream hose coupled to the EGR passage, upstream of the restrictive orifice, and a downstream hose coupled to the EGR passage, downstream of the restrictive orifice;
    a spark plug for providing spark to the cylinder;
    a knock sensor;
    a manifold absolute pressure (MAP) sensor coupled to the intake manifold for estimating an engine airflow;
    an exhaust gas oxygen sensor coupled to the exhaust system; and
    a controller configured with computer readable instructions stored on non-transitory memory for:
        operating the engine with an EGR flow;
        estimating a cylinder air amount based on each of the engine airflow and the EGR flow;
        calculating each of a fuel command based on the cylinder air amount and a correction to the fuel command based on exhaust gas oxygen sensor output;

calculating a spark timing based in part on the EGR flow;

detecting knock based on output of the knock sensor;

retarding spark from the determined spark timing in response to knock detection; and indicating potential disconnection of the upstream hose from at least one of the EGR passage and the differential pressure sensor responsive to each of the correction to the fuel command being greater than a threshold enrichment, an integrated output of the knock sensor being greater than a threshold intensity, and spark retard reaching a spark retard threshold.

9. The system of claim 8, wherein the controller includes further instructions for:

responsive to the indication of potential disconnection of the upstream hose, disabling the EGR system and confirming the disconnection of the upstream hose of the differential pressure sensor based on a presence of EGR flow through the EGR passage.

10. The system of claim 9, wherein disabling the EGR system further includes commanding the EGR valve fully closed and setting the EGR flow to zero.

11. The system of claim 9, wherein confirming the disconnection of the upstream hose based on the presence of EGR flow includes measuring a delta pressure across the restrictive orifice with the differential pressure sensor while the EGR valve is maintained closed and indicating disconnection of the upstream hose in response to the delta pressure being lower than a threshold.

* * * * *